(12) United States Patent
Lee et al.

(10) Patent No.: US 8,285,545 B2
(45) Date of Patent: Oct. 9, 2012

(54) VOICE COMMAND ACQUISITION SYSTEM AND METHOD

(75) Inventors: Chu Hee Lee, San Jose, CA (US);
Johnathan Lee, Puyallup, WA (US);
Daniel Rosario, Santa Cruz, CA (US);
Edward Kim, San Francisco, CA (US);
Thomas Chan, San Jose, CA (US)

(73) Assignee: Volkswagen AG, Wolfsburg (DE)

( * ) Notice: Subject to any disclaimer, the term of this patent is extended or adjusted under 35 U.S.C. 154(b) by 1039 days.

(21) Appl. No.: 12/245,340

(22) Filed: Oct. 3, 2008

(65) Prior Publication Data

US 2010/0088093 A1 Apr. 8, 2010

(51) Int. Cl.
*G10L 15/20* (2006.01)

(52) U.S. Cl. ........ 704/233; 704/275; 704/226; 704/270; 704/251; 704/243; 381/86; 381/92; 381/57; 381/71.4; 379/88.03; 379/88.04; 701/32.9; 701/29.1; 701/33.6; 340/692

(58) Field of Classification Search .................. 704/233, 704/275, 226, 234, 241, 270, 243, 231, 251; 381/86, 92, 122, 359, 357, 91, 57, 71.4, 56, 381/111, 389; 379/88.03, 88.04; 455/569.2; 701/32.9, 29.1, 33.6, 33.7, 34.3; 340/692

See application file for complete search history.

(56) References Cited

U.S. PATENT DOCUMENTS

| | | | | |
|---|---|---|---|---|
| 4,811,404 A | * | 3/1989 | Vilmur et al. | 381/94.3 |
| 5,499,181 A | * | 3/1996 | Smith | 455/456.1 |
| 5,903,819 A | * | 5/1999 | Romesburg | 455/63.1 |
| 6,230,138 B1 | * | 5/2001 | Everhart | 704/275 |
| 6,587,824 B1 | * | 7/2003 | Everhart et al. | 704/275 |
| 6,845,251 B2 | * | 1/2005 | Everhart et al. | 455/563 |
| 6,959,275 B2 | * | 10/2005 | Erell | 704/225 |
| 7,103,460 B1 | * | 9/2006 | Breed | 701/32.9 |
| 7,171,356 B2 | | 1/2007 | Deisher et al. | |
| 7,240,010 B2 | * | 7/2007 | Papadimitriou et al. | 704/275 |
| 7,516,065 B2 | * | 4/2009 | Marumoto | 704/215 |
| 7,672,756 B2 | * | 3/2010 | Breed | 701/1 |
| 7,920,102 B2 | * | 4/2011 | Breed | 345/7 |
| 7,966,112 B1 | * | 6/2011 | Morris, Jr. | 701/29.4 |
| 2002/0065661 A1 | * | 5/2002 | Everhart et al. | 704/275 |
| 2002/0097884 A1 | * | 7/2002 | Cairns | 381/71.4 |
| 2002/0116496 A1 | * | 8/2002 | Lew et al. | 709/226 |
| 2003/0069734 A1 | * | 4/2003 | Everhart | 704/275 |

(Continued)

FOREIGN PATENT DOCUMENTS

DE 4106405 A1 9/1991

(Continued)

*Primary Examiner* — Vijay B Chawan
(74) *Attorney, Agent, or Firm* — Laurence A. Greenberg; Werner H. Stemer; Ralph E. Locher

(57) ABSTRACT

A voice command acquisition method and system for motor vehicles is improved in that noise source information is obtained directly from the vehicle system bus. Upon receiving an input signal with a voice command, the system bus is queried for one or more possible sources of a noise component in the input signal. In addition to vehicle-internal information (e.g., window status, fan blower speed, vehicle speed), the system may acquire external information (e.g., weather status) in order to better classify the noise component in the input signal. If the noise source is found to be a window, for example, the driver may be prompted to close the window. In addition, if the fan blower is at a high speed level, it may be slowed down automatically.

8 Claims, 2 Drawing Sheets

U.S. PATENT DOCUMENTS

2005/0275558 A1* 12/2005 Papadimitriou et al. ...... 340/692
2008/0129475 A1*  6/2008 Breed et al. .................... 340/438

FOREIGN PATENT DOCUMENTS

| | | | |
|---|---|---|---|
| DE | 4325404 | A1 | 2/1995 |
| EP | 0531094 | B1 | 10/1997 |
| JP | 59102633 | A | 6/1984 |
| JP | 01009016 | A | 1/1989 |
| JP | 03274099 | A | 12/1991 |

\* cited by examiner

VOICE COMMAND ACQUISITION SYSTEM AND METHOD

BACKGROUND OF THE INVENTION

1. Field of the Invention

The invention lies in the field of automotive technology. More specifically, the invention pertains to voice command acquisition and speech recognition in motor vehicles.

Vehicle speech recognition systems require capturing the user voice input, which is then analyzed and reduced into a specific grammar used to input information into infotainment or integrated vehicle systems.

In many cases, the vehicle environment is too noisy to properly capture the user audio input (e.g. open sun roof, open windows, ventilation fan at high setting, or the like). The quality and accuracy of speech recognition algorithms are directly affected by the amount of noise present in the audio signal, in relation to the vocal audio information.

2. Description of the Related Art

German published patent application DE 43 25 404 A1 discloses a speech recognition system in which noise signals and background noise signals are eliminated so as to achieve better recognition. A catalogue of background noises are thereby stored in code books. Upon the input of a corresponding signal, the code books are queried and the background noise is eliminated, in case it is a known noise. If a given noise source is recognized by the system, it is also possible to issue a command signal to temporarily eliminate the noise source, for example, by automatically turning down the blower fan, or by closing a window.

A variety of additional efforts have been made in the prior art so as to improve speech recognition by eliminating noise signal components. For example, Japanese patent application JP 10 009 016 A reduces the speed of the blower fan of it's A/C unit when speech has been recognized in connection with a radio communication unit. German published patent application DE 41 06 405 A1 describes a speech recognition system in which background noise is analyzed and compensated. Further, the system determines if, and by how much, a window is open and the speech recognition processing is adapted accordingly. U.S. Pat. No. 7,171,365 B2 determines a background noise so that the same may be compensated during the speech recognition.

All of these approaches have in common that the noise signal is acquired and analyzed electronically within the speech recognition system. The focus for solving the technical issues concerning noise disruption lies on advances in microphone technology, improving processing algorithms for noisy signals, or the elimination of speech as a feature for models with a high assumed noise level (e.g., a convertible).

In certain vehicle speech recognition systems the audio speakers may be muted when a push-to-talk button is activated. In the alternative, as described in Japanese patent application JP 59 102 633 A, the driver may issue a voice command "be quiet." In response, the speaker volume may be reduced, the blower fan may be turned down, and windows or the sunroof may be closed.

BRIEF SUMMARY OF THE INVENTION

It is accordingly an object of the invention to provide a speech recognition system, which overcomes the above-mentioned disadvantages of the heretofore-known devices and methods of this general type and which further improves the accuracy of speech recognition in the typically very noise motor vehicle environment and which increases the confidence level of the voice acquisition and command recognition.

With the foregoing and other objects in view there is provided, in accordance with the invention, a voice command acquisition method for motor vehicles. The method comprises the following steps:

receiving an input signal containing a useful voice component and a noise component;

querying an electronic system of the motor vehicle for one or more possible sources of the noise component and classifying the noise component as one of a plurality of characteristic noise components;

eliminating or reducing an intensity of the noise component by actively controlling the source of the noise component; and subsequently continuing with the voice command acquisition.

In accordance with an added feature of the invention, the vehicle bus is queried for status information regarding one or more of the following: a window status, a sunroof status, a wiper status, a vehicle speed, an engine speed (rpm), and audio volume level, a cabin noise level from active noise cancellation, and a fan (AC, heater) blowing level.

If the result of the query indicates that the noise source is a noise source to be eliminated by a vehicle occupant, prompting the vehicle occupant to eliminate or alleviate the noise source.

If the result of the query indicates that the noise source is a noise source to be eliminated automatically, the same is automatically eliminated or alleviated through a command through the vehicle bus.

In accordance with an another feature of the invention, the system bus of the vehicle is queried for information regarding a status of the windows and a sunroof, if present, and, if a result of the querying step indicates that window or the sunroof is open, the vehicle occupants or the driver is prompted to close the window or sunroof.

With the above and other objects in view there is also provided, in accordance with the invention, a voice command acquisition system in a motor vehicle. The system comprises:

a microphone disposed to capture a voice command uttered by an occupant of the motor vehicle;

a processor connected to a system bus of the motor vehicle and to the microphone for receiving a microphone capture signal containing the voice command and a noise component;

the processor being programmed to:

query the system bus for a status of possible noise sources in the microphone capture signal;

issue a command triggering the noise source to be eliminated or alleviated for improving a success rate of a voice recognition; and prompt for a continuance of the voice command acquisition and recognition.

In accordance with a concomitant feature of the invention, the processor is programmed to query the system bus for the status of a vehicle window and, if present, a sunroof. If the window or the sunroof is determined to be open, the processor causes a vehicle occupant to be prompted to close the window or the sunroof.

The invention thus describes situational responses to inaccurate or poor quality audio information, which causes a speech recognition process to have either an incorrect or failed attempt to recognize a voice command, given access to the vehicle status information.

That is, the invention proposes a solution that is considerably simplified as compared with the prior art. Instead of attempting, with complicated and processor-intensive algorithms, to peel the useful voice information out of the amalgam of sound information so as to eliminate therefrom the noise signal components, the invention calls for the elimination or reduction of the noise sources themselves. This is not to say that optimization algorithms are not also applied in the system according to the invention. The speech recognition success rate of this adaptive system is simply improved by the active and/or directed elimination of the noise source.

The invention thus is based on three primary components:

The vehicle monitors the environment and its status using on-board sensors and controllers (e.g., windows state, sun roof state, wiper state, cabin noise level, vehicle speed, audio volume, AC fan level, etc.)

When the recognition system fails, the vehicle offers suggestions or cues to the driver which could improve the audio quality and/or when the recognition system fails, the vehicle actively changes the vehicle state.

Audio processing algorithms can be tuned based on increased vehicle state information.

The invention, in a first aspect, may thus be classified as active noise cancellation and active speech•selection enhanced by environment classification. In some cases, there may not be a vehicle sensor to help classify the speech environment. In that case, the actual audio input is analyzed for environment classification. By overlaying background-free speech with background noise from different environmental contexts, a set of standard acoustic and prosodic features can be extracted and compared across the various contexts. Different acoustical environments that can be classified include doors slamming, phone ringing, laughs/coughs, emergency vehicle sirens, or a stone chipping on the windshield. Once the environment is classified, different noise cancellation and speech selection algorithms can be used to optimize the speech recognition accuracy.

The invention is also directed to the utilization of external data source for confidence level improvement in the speech recognition. That is, in order to improve the confidence level of the vehicle that senses the environment, external data such as weather, traffic, etc. could be used. For example, real-time weather information corroborate the rain that the vehicle sensor (or wiper status) would detect. If such external data is already available for other uses, such as for navigation, the speech command acquisition system can take advantage of the data to increase its confidence level, and thus reducing false positive actions.

Other features which are considered as characteristic for the invention are set forth in the appended claims.

Although the invention is illustrated and described herein as embodied in a voice command acquisition system for motor vehicles, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF A PREFERRED EMBODIMENT OF THE INVENTION

Figure 1:
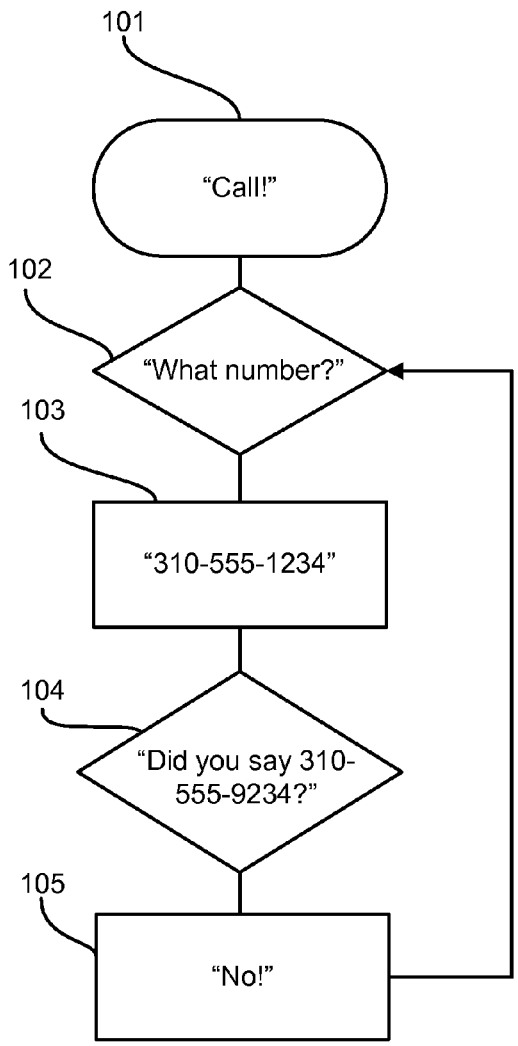
FIG. 1 is a flowchart illustrating a voice command acquisition sequence according to the prior art.

Referring now to the figures of the drawing in detail and first, particularly, to FIG. 1 thereof, the problems associated with the prior art are best understood with a corresponding example.

A driver 1 first initiates a speech recognition event by uttering the command "call" at 101. The system recognizes the command and enters into a telephone number acquisition sequence. The driver is prompted for a selection by way of a query "what number?" at 102. The driver responds with a number at 103—here, 310-555-1234—which is detected and digitized by the system. Next, the system provides an audible confirmation 104 before the number is actually dialed and the connection is established.

In the case of FIG. 1, however, the noise level attached to the usable voice signal is so great that the system did not properly understand the command. The system asks for confirmation: "Did you say 310-555-9234?" at 104. As this is the incorrect number, the driver rejects the suggestion by uttering "no!" at 105. At this point, the system returns to the original query 102 ("what number?") and the above sequence is repeated until a positive response "yes" is received from the driver. During a repeated acquisition sequence, the system may use additional noise cancellation algorithms in order to subtract as much noise as possible from the input signal and to better "peel" the useful voice signal from the input signal. At certain noise levels, however, this is impossible and the voice command cannot be properly understood. As long as the system misunderstands, the sequence is repeated. This, of course, leads to a considerable amount of frustration and distraction for the driver.

Figure 2:
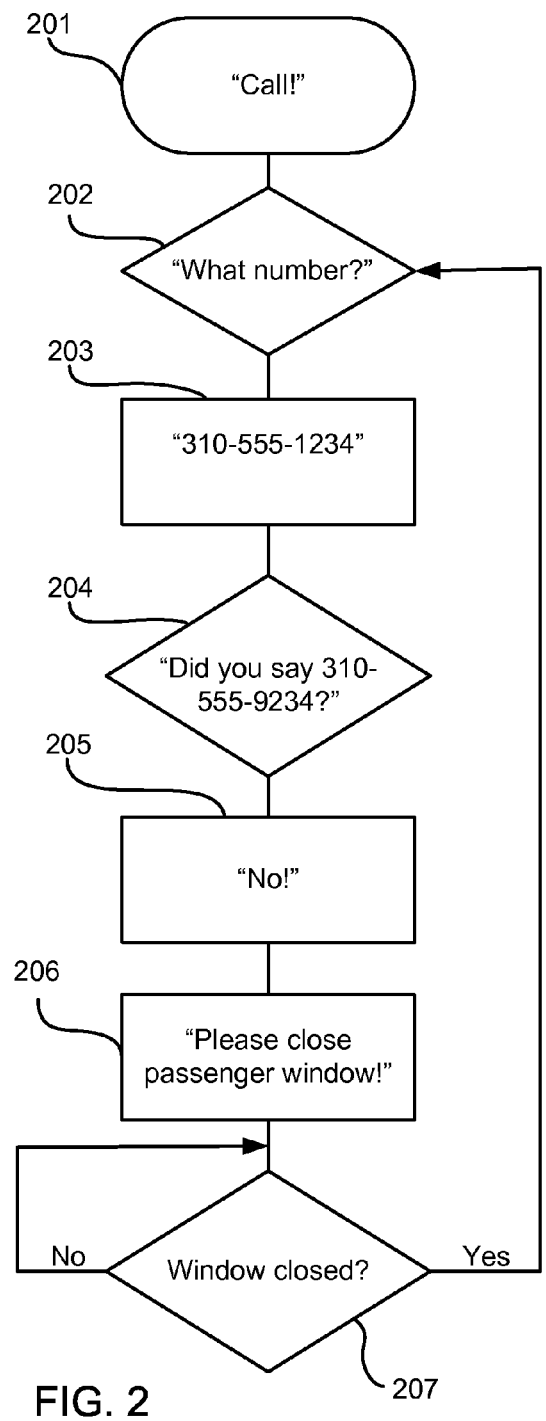
FIG. 2 is a flowchart illustrating an exemplary voice recognition sequence according to the invention.

Referring now to FIG. 2, which follows the same initial sequence from step 201 to step 205 (corresponding to 101-105 in FIG. 1), the system according to the invention does not simply repeat the acquisition steps ad nauseam. Instead, after the first sequence 201-205 has been run through and the result at 205 is "no," the acquisition system checks additional controller data.

The basic premise is that, if a noise source is actually known, it may be eliminated or reduced physically, instead of applying complicated and fail-prone algorithms. The speech recognition system makes use of vehicle sensor and controller data that is available in any case:

The following information is available on the vehicle bus:
Windows status
Sunroof status
Wiper status
Vehicle speed
Engine speed (rpm)
Audio volume level
Cabin noise level from active noise cancellation
Fan (AC, heater) blowing level.

The vehicle system now can take an active vehicle role in the speech capturing process. Using the information from above, the vehicle can identify the source of noise and notify the driver of the possible causes of low speech recognition performance.

Also, the vehicle system will use the most suitable noise cancellation algorithm to capture the audio input if multiple noise cancellation algorithms are present. For instance, at a given engine speed, it is possible to eliminate or reduce a very narrow frequency band from the input signal, so as to eliminate the engine noise signal. Also, the vehicle speed translates to a narrow frequency band of road noise that is present in the cabin. If no general noise cancellation is active, it is possible to eliminate the noise frequency from the speech input signal electronically.

In the example shown in FIG. 2, the vehicle bus shows that the passenger window is open. Accordingly, the driver is prompted at 206 to close the window. Here, we show the prompt as "Please close the passenger window." It may, of course, be a friendlier instruction, such as "I'm sorry, there was too much wind noise and interference from the front passenger side. Please roll up the passenger side window and try again." At that point the system enters into a query loop at 207 to see whether or not the window has been closed. As soon as the closure of the window has been ascertained, the capture sequence is once more entered by returning to the initial prompt at 202.

It will be understood that the steps 206 and 207 are but exemplary. It is possible, for example for the system to have found that the window is open, the sunroof is open, and the fan is set to high blower volume. The system may then prompt the driver to close the window and the sunroof, and also reduce the speed of the blower fan. The latter may be effected automatically, without prompting the driver. Similarly, the audio volume may be reduced automatically for the duration of the acquisition sequence (and also for the following telephone conversation).

It will be understood that the system may also check for known noise sources prior to the rejection by the driver, such as right after step 103. This may be done if the input signal carries a considerable amount of noise and it is clear from the beginning (i.e., after step 202 or 203) or that successful voice recognition is rather uncertain. The system may already prompt for the alleviation of the noise source, or automatically eliminate the noise source after the initial "call" command.

Figure 3:
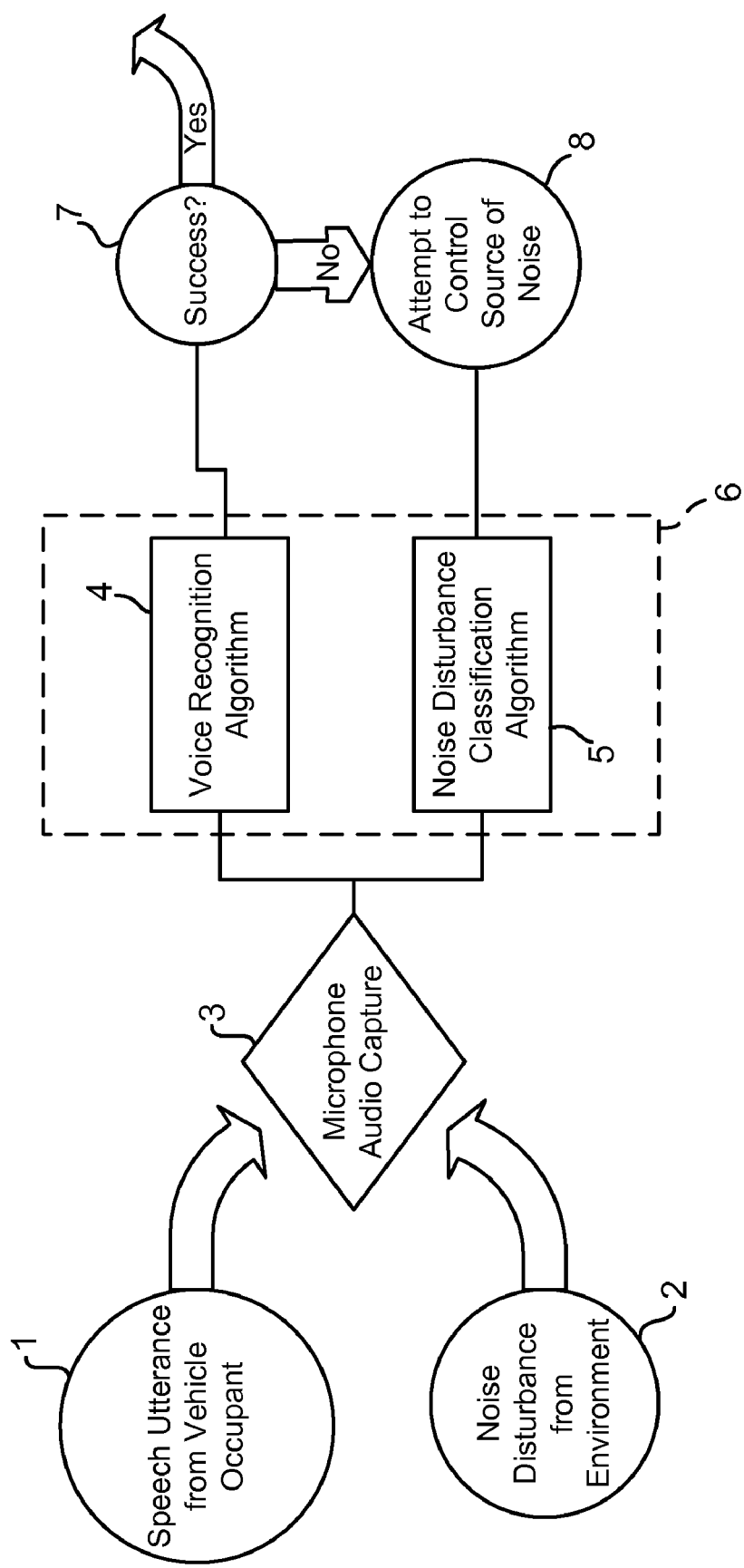
FIG. 3 is a schematic illustration of a command acquisition system according to the invention.

With reference to FIG. 3, the novel system is triggered to become operational upon detecting a speech utterance 1 from the occupant (typically, the driver, but the command may also be uttered by a passenger). The input into a microphone 3, however, does not only contain the useful voice signal from the speech utterance 1, but also a noise component 2 from any of a variety of possible noise sources. The microphone signal with the useful voice component and the noise component is submitted to a voice recognition algorithm 4 and also to a noise disturbance classification algorithm 5. The algorithms 4 and 5 are collectively processed in a processor 6, which is connected into the system bus of the motor vehicle.

The query and response 104/105 and 204/205 are processed in a module 7. If success is indicated, the correspondingly recognized voice command is initiated (e.g., the telephone call is placed). If failure is indicated by the module 7, the system makes an attempt to control the noise source at module 8. As noted, several actions may follow, such as: the driver may be prompted to close a window, and/or the fan blower and the audio volume may be reduced, and/or the processor may employ a special algorithm to eliminate a given frequency band corresponding to the current engine hum frequency, and/or a voice recognition algorithm may be employed to eliminate rain drop noise on the windshield (i.e., if the current weather report indicate a downpour in the area). All of these have in common that the noise component is classified not (only) through the noise signal itself, but by determining what type of possible noise source may indeed by the source, or at least a primary source, of the noise component.

The invention claimed is:

1. A voice command acquisition method for motor vehicles, which comprises the following steps:
   receiving an input signal containing a useful voice component and a noise component;
   querying an electronic system of the motor vehicle for one or more possible sources of the noise component and classifying the noise component as one of a plurality of characteristic noise components;
   eliminating or reducing an intensity of the noise component by actively controlling the source of the noise component; and
   subsequently continuing with the voice command acquisition.

2. The method according to claim 1, wherein the querying step comprises querying a vehicle bus for status information regarding one or more of the following: a window status, a sunroof status, a wiper status, a vehicle speed, an engine speed, and audio volume level, a cabin noise level from active noise cancellation, and a fan blowing level.

3. The method according to claim 2, wherein, if a result of the querying step indicates that the noise source is a noise source to be eliminated by a vehicle occupant, prompting the vehicle occupant to eliminate or alleviate the noise source.

4. The method according to claim 3, wherein, if a result of the querying step indicates that the noise source is a noise source to be eliminated automatically, automatically eliminating or alleviating the noise source through the vehicle bus.

5. The method according to claim 1, wherein the querying step comprises querying a vehicle bus for status information regarding a status of the windows and a sunroof, if present, of the vehicle and, if a result of the querying step indicates that window or the sunroof is open, prompting a vehicle occupant to close the window or sunroof.

6. The method according to claim 1, wherein the eliminating step comprises prompting a driver or passenger of the motor vehicle to eliminate or alleviate the noise source.

7. A voice command acquisition system in a motor vehicle, which comprises the following steps:
   a microphone disposed to capture a voice command uttered by an occupant of the motor vehicle;
   a processor connected to a system bus of the motor vehicle and to said microphone for receiving a microphone capture signal containing the voice command and a noise component;
   said processor being programmed to:
      query the system bus for a status of possible noise sources in the microphone capture signal;
      issue a command triggering the noise source to be eliminated or alleviated for improving a success rate of a voice recognition; and
      prompt for a continuance of the voice command acquisition and recognition.

8. The system according to claim 7, wherein said processor is programmed to query the system bus for the status of a vehicle window and, if present, a sunroof and, if a window or the sunroof is determined to be open, to prompt a vehicle occupant to close the window or the sunroof.

* * * * *